US010340962B2

(12) United States Patent
Utter et al.

(10) Patent No.: US 10,340,962 B2
(45) Date of Patent: Jul. 2, 2019

(54) AMPLITUDE DOMAIN CIRCUITS AND METHODS FOR REDUCING AN INTERFERENCE SIGNAL THAT SPECTRALLY OVERLAPS A DESIRED SIGNAL

(71) Applicant: The Aerospace Corporation, El Segundo, CA (US)

(72) Inventors: Alexander C. Utter, Hawthorne, CA (US); Philip Dafesh, Manhattan Beach, CA (US); Phillip Brian Hess, Venice, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 15/149,002

(22) Filed: May 6, 2016

(65) Prior Publication Data

US 2017/0324434 A1  Nov. 9, 2017

(51) Int. Cl.
*H04B 1/10* (2006.01)

(52) U.S. Cl.
CPC ... *H04B 1/1036* (2013.01); *H04B 2001/1063* (2013.01)

(58) Field of Classification Search
CPC .................. H04B 1/16; H04B 1/1063; H04B 2001/1063
USPC ..................... 455/63.7, 307, 277.1
See application file for complete search history.

(56) References Cited

U.S. PATENT DOCUMENTS

| 4,246,541 | A | * | 1/1981 | Ishigaki | H03D 3/002 |
| | | | | | 329/316 |
| 5,097,218 | A | | 3/1992 | Cooper | |
| 5,517,531 | A | * | 5/1996 | Bond | H01Q 3/24 |
| | | | | | 375/346 |
| 5,533,071 | A | * | 7/1996 | Krishnamurthy | H04L 27/02 |
| | | | | | 375/346 |

(Continued)

FOREIGN PATENT DOCUMENTS

EP    0 393 542 A2    10/1990

OTHER PUBLICATIONS

United States Patent and Trademark Office Notice of Allowance for U.S. Appl. No. 14/918,315, dated Dec. 29, 2016 (5 pages).

(Continued)

*Primary Examiner* — Wednel Cadeau
(74) *Attorney, Agent, or Firm* — Jones Day (57) ABSTRACT

Under one aspect, a method for reducing interference in a received signal can include splitting a received signal into a first portion and a second portion, the received signal comprising a desired signal and an interference signal that spectrally overlaps the desired signal. The method also can include estimating an amplitude A(t) of the first portion as a function of time. The method also can include suppressing at least a portion of the interference signal in the estimated amplitude A(t) to generate an interference suppressed amplitude A'(t). The method also can include delaying the second portion by an amount of time corresponding to the estimation and suppression. The method also can include multiplying the interference suppressed amplitude A'(t) by the (Continued)

delayed second portion to obtain an output having reduced contribution from the interference signal.

24 Claims, 7 Drawing Sheets

(56) References Cited

U.S. PATENT DOCUMENTS

| | | | |
|---|---|---|---|
| 5,654,538 A * | 8/1997 | Kane | G02F 3/00 |
| | | | 250/214 LA |
| 5,974,100 A * | 10/1999 | Carsello | H04L 27/3809 |
| | | | 375/346 |
| 6,097,820 A | 8/2000 | Turner | |
| 6,266,633 B1 | 7/2001 | Higgens et al. | |
| 7,266,166 B2 | 9/2007 | Henttu | |
| 7,646,559 B1 | 1/2010 | Cheung et al. | |
| 8,515,335 B2 | 8/2013 | Dafesh et al. | |
| 9,197,360 B2 | 11/2015 | Wyckoff | |
| 9,391,654 B2 | 7/2016 | Wyckoff et al. | |
| 9,654,158 B2 | 5/2017 | Dafesh et al. | |
| 9,923,598 B2 | 3/2018 | Dafesh et al. | |
| 2002/0094022 A1 | 7/2002 | Bially et al. | |
| 2002/0155812 A1 * | 10/2002 | Takada | H04B 1/123 |
| | | | 455/63.1 |
| 2003/0016079 A1 | 1/2003 | Carrozza et al. | |
| 2004/0028222 A1 | 2/2004 | Sewell et al. | |
| 2008/0056395 A1 | 3/2008 | Brink et al. | |
| 2008/0107217 A1 * | 5/2008 | Vrcelj | H04B 1/1036 |
| | | | 375/350 |
| 2009/0191827 A1 | 7/2009 | Hellberg | |
| 2012/0140685 A1 | 6/2012 | Lederer et al. | |
| 2013/0170721 A1 | 6/2013 | Kim et al. | |
| 2014/0308046 A1 | 10/2014 | Bliss et al. | |
| 2015/0311928 A1 | 10/2015 | Chen et al. | |
| 2016/0261297 A1 | 9/2016 | Heinikoski et al. | |
| 2017/0295581 A1 | 10/2017 | Takagi | |

OTHER PUBLICATIONS

Amin, "Interference mitigation in spread spectrum communication systems using time-frequency distributions," IEEE Trans. Signal Processing 45(1):90-101 (1997).
Amoroso, "Adaptive AID Converter to Suppress CW Interference in DSPN Spread-Spectrum Communications," IEEE Trans. Commun. COM-31(10):1117-1123 (1983).
Caijie et al., "Rejection of frequency sweeping interference in DSSS systems using improved polar exciser algorithm," IEEE 1228-1231 (2007).
Capozza et al., "Measured Effects of a Narrowband Interference Suppressor on GPS Receivers," ION 55th Annual Meeting, Cambridge, MA, pp. 1-7 (1999).
Choi et al., "Suppression of narrow-band interference in DS-spread spectrum systems using adaptive IIR notch filter," Signal Process. 82(12):2003-2013 (2002).
Dipietro, "An FFT based technique for suppressing narrow-band interference in PN spread spectrum communications systems," International Conference on Acoustics, Speech, and Signal Processing 2:1360-1363 (1989).
Ferrara, "A Method for Cancelling Interference from a Constant Envelope Signal," IEEE Transactions on Acoustics, Speech, and Signal Processing 33(1):316-319 (1985).
Gelli et al., "Cyclostationarity-based filtering for narrowband interference suppression in direct-sequence spread-spectrum systems," IEEE J. Select. Areas Commun. 16(9):1747-1755 (1998).
Henttu, "A New Interference Suppression Algorithm Against Broadband Constant Envelope Interference," IEEE Milcom 2: 742-746 (2000).
Hui et al, "Maximum Likelihood Sequence Estimation in the Presence of Constant Envelope Interference," IEEE Vehicular Technology Conference 2:1060-1064 (2003).
Ketchum et al., "Adaptive algorithms for estimating and suppressing narrow-band interference in PN spread-spectrum systems," IEEE Trans. Commun. 30(5):913-924 (1982).
Ouyang et al., "Short-time Fourier transform receiver for nonstationary interference excision in direct sequence spread spectrum communications," IEEE Trans. Signal Processing 49(4):851-863 (2001).
Pasupathy, "Compact power spectrum, good error rate performance, and easy synchronization make MSK an attractive digital modulation technique," IEEE Communications Magazine 17:14-22 (1979).
Pouttu et al., "Effects of Rayleigh fading to method-selection in interference suppression," IEEE 2:1225-1230 (2005).
Pouttu et al., "Synchronization of FH/DS Signal with Interference Suppression Diversity," IEEE Ninth International Symposium on Spread Spectrum Techniques and Applications pp. 69-73 (2006).
Przyjemski et al., "GPS Anti-Jam Enhancement Techniques," Proc. ION 49th Annual Meeting, pp. 41-50 (1993).
Raustia, "Combining method for FH-DS communications," IEEE, 4:2289-2293 (2005).
Ward, "Interference & Jamming: (Un)intended Consequences," TLS NovAtel's Thought Leadership Series, pp. 28-29 (2012).
United States Patent and Trademark Office, Non-Final Office Action for U.S. Appl. No. 14/262,532, dated Jan. 29, 2015 (9 pages).
United States Patent and Trademark Office, Notice of Allowance for U.S. Appl. No. 14/262,532, dated Jul. 21, 2015 (8 pages).
United States Patent and Trademark Office, Non-Final Office Action for U.S. Appl. No. 14/887,848, dated Jan. 12, 2016 (14 pages).
United States Patent and Trademark Office, Notice of Allowance for U.S. Appl. No. 14/887,848, dated Apr. 8, 2016 (16 pages).
United States Patent and Trademark Office, Non-Final Office Action for U.S. Appl. No. 14/918,315, dated May 18, 2016 (9 pages).

* cited by examiner

AMPLITUDE DOMAIN CIRCUITS AND METHODS FOR REDUCING AN INTERFERENCE SIGNAL THAT SPECTRALLY OVERLAPS A DESIRED SIGNAL

FIELD

This application relates to circuits and methods for reducing an interference signal that spectrally overlaps with a desired signal.

BACKGROUND

Strong interference has become a common problem as the radio spectrum has become more crowded. Constant envelope, or approximately constant envelope signals are popular because such waveforms are compatible with non-linear amplifiers which can be more energy efficient than linear amplifiers. Examples of constant envelope signals include: frequency modulation, frequency shift keying, minimum shift keying, Gaussian minimum shift keying, multi-h continuous phase frequency modulation, linear FM, continuous wave, and many frequency hopping signals. Any of these types of constant envelope signals can cause interference with other, desired signals, particularly where the desired signal and the constant envelope signal spectrally overlap with one another. Non-constant envelope interference also can be problematic, both with constant envelope signals and non-constant envelope signals with which the interference overlaps. Interference can be intentional or inadvertent.

Thus, what is needed are improved circuits and methods for reducing interference that spectrally overlaps a desired signal.

SUMMARY

Embodiments of the presently disclosed subject matter provide amplitude domain circuits and methods for reducing an interference signal that spectrally overlaps a desired signal.

Under one aspect, a method for reducing interference in a received signal can include splitting a received signal into a first portion and a second portion, the received signal comprising a desired signal and an interference signal that spectrally overlaps the desired signal. The method also can include estimating an amplitude $A(t)$ of the first portion as a function of time. The method also can include suppressing at least a portion of the interference signal in the estimated amplitude $A(t)$ to generate an interference suppressed amplitude $A'(t)$. The method also can include delaying the second portion by an amount of time corresponding to the estimation and suppression. The method also can include multiplying the interference suppressed amplitude $A'(t)$ by the delayed second portion to obtain an output having reduced contribution from the interference signal.

The method further can include scaling the output based on a dynamic range of circuitry receiving the output. For example, such scaling can include dividing the output by $A(t)$. As another example, such scaling can include applying automatic gain control before or after the splitting or before or after the multiplying.

The received signal can be a radio-frequency signal or an intermediate-frequency signal.

The received signal can be a baseband signal. In some examples, the second portion includes in-phase and quadrature components. The delaying can include delaying each of the in-phase and quadrature components. The multiplying can include multiplying the interference suppressed amplitude $A'(t)$ by the delayed in-phase component to obtain an in-phase component output having reduced contribution from the interference signal. The multiplying also can include multiplying the interference suppressed amplitude $A'(t)$ by the delayed quadrature component to obtain a quadrature component output having reduced contribution from the interference signal.

Said suppressing can include applying a high-pass or notch filter to the amplitude $A(t)$. The method also can include adjusting a bandwidth of the high-pass or notch filter based on a characteristic of the output.

Under another aspect, a circuit for reducing interference in a received signal can include a splitter subcircuit configured to split a received signal into a first portion and a second portion, the received signal comprising a desired signal and an interference signal that spectrally overlaps the desired signal. The circuit further can include an envelope detector coupled to the splitter subcircuit and configured to estimate an amplitude $A(t)$ of the first portion as a function of time. The circuit further can include an interference suppression subcircuit coupled to the envelope detector and configured to suppress at least a portion of the interference signal in the estimated amplitude $A(t)$ to generate an interference suppressed amplitude $A'(t)$. The circuit further can include a matched delay subcircuit coupled to the splitter subcircuit and configured to delay the second portion by an amount of time corresponding to the estimation and suppression. The circuit further can include a multiplier subcircuit coupled to the matched delay subcircuit and the interference suppression subcircuit and configured to multiply the interference suppressed amplitude $A'(t)$ by the delayed second portion to obtain an output having reduced contribution from the interference signal.

The circuit further can include scaling subcircuitry configured to scale the output based on a dynamic range of circuitry receiving the output. The scaling subcircuitry can be configured to divide the output by $A(t)$. The scaling subcircuitry can be configured to apply automatic gain control before or after the splitting or before or after the multiplying.

The received signal can be a radio-frequency signal or an intermediate-frequency signal.

The received signal can be a baseband signal. The second portion can include in-phase and quadrature components. The matched delay subcircuit can be configured so as to delay each of the in-phase and quadrature components. The multiplier subcircuit can be configured so as to multiply the interference suppressed amplitude $A'(t)$ by the delayed in-phase component to obtain an in-phase component output having reduced contribution from the interference signal. The multiplier subcircuit further can be configured so as to multiply the interference suppressed amplitude $A'(t)$ by the delayed quadrature component to obtain a quadrature component output having reduced contribution from the interference signal.

The interference suppression subcircuit can include a high-pass or notch filter configured to filter the amplitude $A(t)$. The circuit further can include adjustment subcircuitry configured so as to adjust a bandwidth of the high-pass or notch filter based on a characteristic of the output.

DETAILED DESCRIPTION

Embodiments of the presently disclosed subject matter provide amplitude domain circuits and methods for reducing an interference signal that spectrally overlaps a desired signal. For example, embodiments of the present circuits and methods can mitigate interference in the analog domain without the explicit determination or use of the signal phase, and can be implemented at radio frequency (RF), at intermediate frequency (IF), or at complex baseband, and can be implemented in the analog or digital domain. Such features can be useful, for example, in receiver systems that may employ a small number of bits (1-2), such as many GPS receivers. Optionally, some embodiments of the present circuits and methods can be implemented using all-analog circuitry, for example simplifying implementation of appliqué upgrades to existing receivers. Additionally, because embodiments of the present circuits and methods need not require the computation of trigonometric functions, the computations used in analog or digital implementations can be implemented relatively simply. For example, in some embodiments, the present circuits and methods implement interference suppression using a combination of relatively simple RF components such as an envelope detector, high-pass or notch filter, and automatic gain control circuitry. In comparison, some previously known techniques for reducing an interference signal that spectrally overlaps a desired signal may require converting a digitized complex baseband signal to the polar amplitude domain, using both amplitude and phase, and then performing operations in the polar domain. Such techniques can require significantly more than 2 bits in order to digitize the complex baseband signals with sufficient precision, and complex trigonometric calculations.

Embodiments of the present circuits and methods can provide simple, reliable suppression of interference that spectrally overlaps with a desired signal. For example, let I and Q be the in-phase and quadrature components of a received signal that includes interference, the desired signal, and noise. Let $A=\sqrt{I^2+Q^2}$ be the instantaneous amplitude of this received signal, where A is a function of time. The amplitude A and phase θ are related to the rectangular I and Q components by the relationships:

$$\frac{I}{A} = \cos\theta \tag{1}$$

$$\frac{Q}{A} = \sin\theta \tag{2}$$

Now let I' and Q' be the in-phase and quadrature components of the received signal after it has been processed by a previously known polar excision technique, such as may use a CORDIC (coordinate rotation digital computer) or similar approach to compute trigonometric functions. Suppose that the processed amplitude after excision is given by A'. Then, applying equations (1) and (2), the resulting processed in-phase and quadrature components I' and Q' can be expressed as:

$$I' = A'\cos\theta = A'\frac{I}{A} \tag{3}$$

$$Q' = A'\sin\theta = A'\frac{Q}{A} \tag{4}$$

Note that by substituting (1) and (2), all trigonometric functions have been removed.

Assuming that the amplitude of the interference varies slowly relative to the desired signal, most of the frequency content of the amplitude of the interference can be expected to be near zero frequency. Thus, some embodiments of the present circuits and methods can employ a filter, such as a high-pass or notch filter that suppresses DC signal components, so as to suppress the effects of interference. The resulting signal amplitude following the present interference suppression, e.g., filtering, can be expressed as A'. As such, the resulting processed in-phase and quadrature components I' and Q' following the present interference suppression can be expressed as:

$$I' = A'\cos\theta = F(A)\frac{I}{A} \tag{5}$$

$$Q' = A'\sin\theta = F(A)\frac{Q}{A} \tag{6}$$

Where F(A) corresponds to the present filtering or other interference suppression applied to the amplitude A of the received signal.

Note that an unprocessed RF signal $s(t)_{RF}$ can be expressed in terms of these component signals as:

$$s(t)_{RF} = I \cos 2\pi f_c t - Q \sin 2\pi f_c t \tag{7}$$

where $f_c$ corresponds to the RF carrier frequency. Additionally, an RF signal that is processed using the present interference suppression circuits and methods can be expressed as:

$$s'(t)_{RF} = I' \cos 2\pi f_c t - Q' \sin 2\pi f_c t \tag{8}$$

By equations (3) and (4), equation (8) can be expressed as:

$$s'(t)_{RF} = \frac{A'}{A}I\cos 2\pi f_c t - \frac{A'}{A}Q\sin 2\pi f_c t \qquad (9)$$

Because F(A) is the same for both I and Q, it can be understood that the radio frequency signal can be directly processed using analog techniques, without the need for phase or rectangular to polar transformations using the following relationship that requires no trigonometric calculations:

$$s'(t)_{RF} = \frac{A'}{A}s(t)_{RF} \qquad (10)$$

In circumstances in which the envelope of A is relatively constant, the value 1/A can be replaced by a simple gain value k, so that equation (10), representing the interference-suppressed RF signal as a function of time, can be expressed as:

$$s'(t)_{RF} = kA's(t)_{RF} \qquad (11)$$

Similarly, the interference-suppressed baseband signal can be expressed as:

$$I' = A'\cos\theta = kA'I \qquad (12)$$

$$Q' = A'\sin\theta = kA'Q \qquad (13)$$

In one non-limiting example, the present circuits and methods implement interference suppression using filtering, such as with an analog high-pass filter. Other filtering such as fast Fourier transform (FFT) based filtering of the amplitude in the digital domain as well as notch or bandpass filtering of the amplitude to selectively remove or inhibit effects of the interference also can be used. In such a case, equations (11), (12), and (13) respectively can be expressed as:

$$s'(t)_{RF} = kF(A)s(t)_{RF} \qquad (14)$$

$$I' = F(A)\cos\theta = kA'I \qquad (15)$$

$$Q' = F(A)\sin\theta = kA'Q \qquad (16)$$

Accordingly, embodiments of the present circuits and methods provide amplitude domain interference suppression in either analog or digital domains, of an RF, IF, or baseband signal, without the need for a CORDIC or similar algorithm to compute trigonometric functions, and without the need to determine or operate upon the phase of the signal, and instead using a relatively simple implementation. As discussed below with regards to the exemplary embodiments illustrated in FIGS. 1, 2A-2E, and 3A-3B, the amplitude A of the received signal as a function of time can be measured directly using an envelope detector or any other suitable circuitry or method known in the art. Additionally, as discussed below with regards to the exemplary embodiments illustrated in FIGS. 2C-2E and 3A-3B, the value of k optionally can be determined as part of an automatic gain control (AGC), optionally which may be included as part of an existing receiver. For example, some AGCs adjust gain based on the output of a number of standard detectors such as an envelope detector, square law detector, true root mean squared (RMS) detector, or logarithmic detector.

Figure 1:
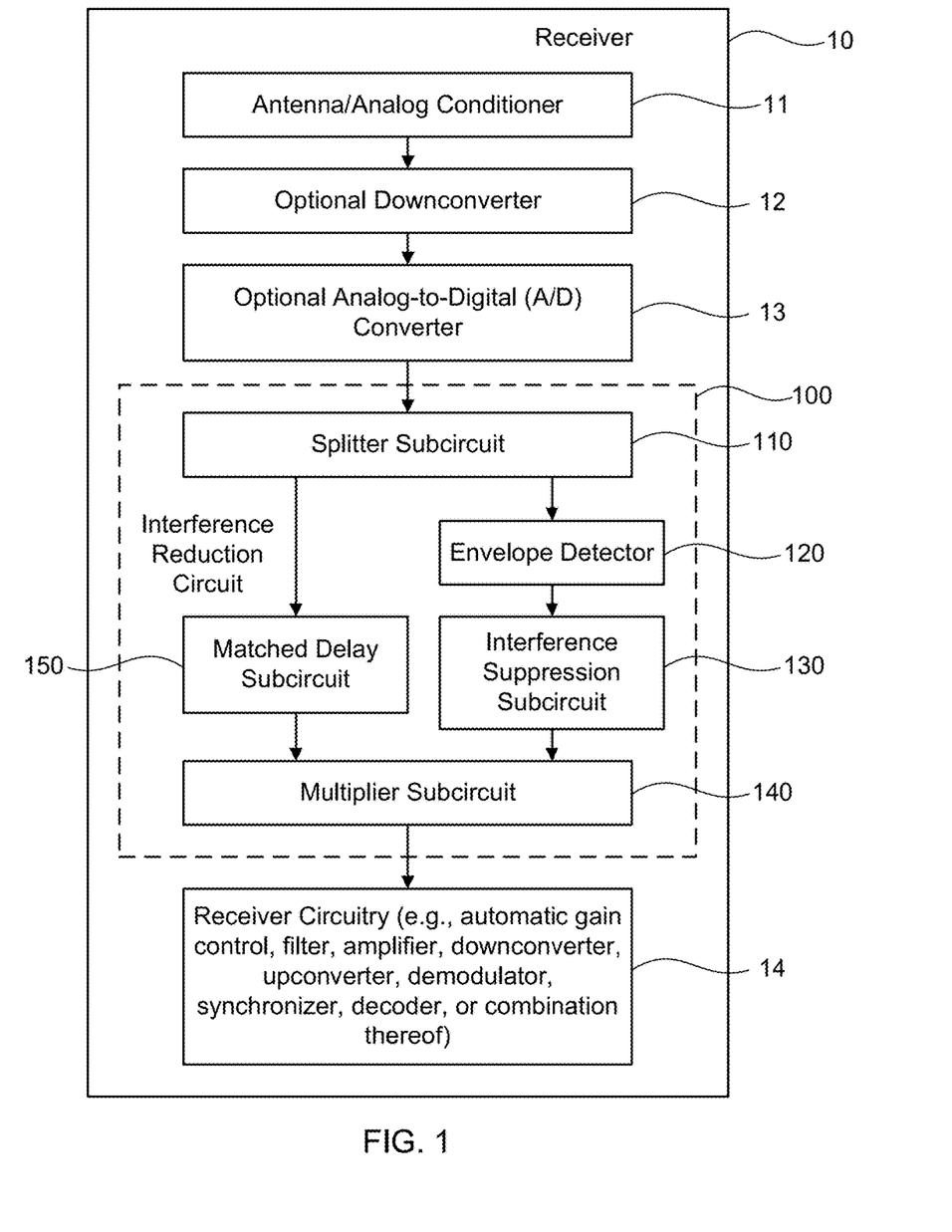
FIG. 1 schematically illustrates a circuit for reducing in the amplitude domain an interference signal that spectrally overlaps a desired signal in a receiver, according to some embodiments provided herein.

FIG. 1 schematically illustrates a circuit for reducing in the amplitude domain an interference signal that spectrally overlaps a desired signal in a receiver, according to some embodiments provided herein. Receiver 10 can include antenna/analog conditioner 11 configured to receive a signal that includes the interference signal and the desired signal; optional downconverter 12 coupled to antenna/analog conditioner 11; optional analog-to-digital (A/D) converter 13 coupled to optional downconverter 12 (or to antenna/analog conditioner 11 if downconverter 12 is omitted); receiver circuitry 14 configured to process the received signals in order to perform conventional receiver functions such as any combination of automatic gain control, filtering, amplification, downconversion, upconversion, demodulation, synchronization, demodulation, decoding, and other functions; and interference reduction circuit 100 disposed therebetween. Receiver circuitry 14 can be implemented using any suitable combination of digital or analog circuitry. Receiver 10 illustrated in FIG. 1A can include, but is not limited to, a global navigation satellite system receiver (GNSS) such as GPS, Glonass, Compass, or Galileo, a cellular wireless communications receiver, a WiFi, Bluetooth, or other radio frequency receiver, or a radar receiver or satellite communication system receiver.

In the embodiment illustrated in FIG. 1, interference reduction circuit 100 includes splitter subcircuit 110 connected to optional A/D converter 13 (or to optional downconverter 12 if A/D converter 13 is omitted, or to antenna/analog receiver if both downconverter 12 and A/D converter 13 are omitted); envelope detector 120 coupled to splitter subcircuit 110; interference suppression subcircuit 130 coupled to envelope detector 120; multiplier subcircuit 140 coupled to interference suppression subcircuit 130 and coupled to receiver circuitry 14; and matched delay subcircuit 150 coupled to splitter subcircuit 110 and to multiplier subcircuit 140. The components of interference reduction circuit 100 can be implemented in various combinations of analog and/or digital circuitry. As one nonlimiting example, interference reduction circuit 100 includes only analog circuitry. Additionally, or alternatively, interference reduction circuit 100 can exclude any circuitry for performing trigonometric calculations, such as a rectangular to polar converter, or for determining the phase of the received signal.

Antenna/analog conditioner 11 illustrated in FIG. 1 can be configured to wirelessly receive a signal, e.g., an RF signal, that includes the desired signal and the interference signal that spectrally overlaps the desired signal. In one example, antenna/analog conditioner 11 can be configured to receive the signal, which can fall within a pre-defined spectral band, and antenna/analog conditioner 11 can include one or more filters configured to block signals having frequencies that fall outside of this band. Appropriate antenna designs for a variety of signals in a variety of contexts, e.g., terrestrial, aircraft, or space-based antennas, are known in the art. In some embodiments, antenna/analog conditioner 11 can be or include a pre-existing structure to which interference reduction circuit 100 can be coupled. Antenna/analog conditioner 11 also can include an input RF filter to select the bandwidth containing desired signal components and reject other signals at frequencies outside of that bandwidth, a low noise amplifier to establish the system noise level. As illustrated in FIG. 1, receiver 10 also optionally can include one or more downconverters 12 to translate the RF bandwidth containing the user signals into the bandwidth over which A/D converter 13 or receiver circuitry 14 operates, e.g., IF or baseband.

The received signal can be digital or analog. For example, in some embodiments in which the present circuits and methods are used to reduce interference for GPS C/A code receivers, the desired signal can include a sum of binary-phase shift keyed (BPSK) modulated signals received at a power level below the power level of the thermal noise present in the GPS C/A code receiver. In such embodiments, the interference can include a signal which completely overlaps the desired signal. Such an example interferer can be referred to as a matched spectral interferer. One type of matched spectral C/A code interferer is a BPSK signal transmitted at the same symbol rate of the C/A code (e.g., 1.023 Mchips/sec), or QPSK/QAM interference using the same symbol rate of the C/A code. In some embodiments, the interference signal can partially spectrally overlap the signal, such as BPSK at lower or higher symbol rates than the desired signal. Another non-limiting example of an interference signal is a frequency modulated signal which sweeps a tone over the desired signal bandwidth. FM swept-tone interference (also referred to as FM chirp) is a common type of signal used to disrupt GPS receivers in intentional GPS jamming equipment (see, e.g., Mitch et al., "Signal Characteristics of Civil GPS Jammers," Proceedings of the 24$^{th}$ International Technical Meeting of the Satellite Division of the Institute of Navigation ION GNSS 2011, Portland Oreg., pp. 1907-1919, September 2011, the entire contents of which are incorporated by reference herein).

As is known to one skilled in the art, other types of spectrally overlapping interference signals may also be present. These signals can be modulated in a number of ways, including, but not limited to, AM modulation, FM modulation, direct sequence spreading, frequency hopped spreading, or phase shift keying.

The interference signal can have, but need not necessarily have, a greater power than that of the desired signal. In some embodiments, the power of the interference signal can be significantly larger than the desired signal, and can be anywhere from 10 times larger than the desired signal (10 dB) to 1,000,000,000 times larger than the desired signal (90 dB). In other embodiments, the interference to signal power ratio can be greater than 1,000,000,000 (90 dB).

Optional A/D converter 13 can include an input port configured to be coupled to antenna/analog conditioner 11 or to optional downconverter 12 via a suitable element (not specifically illustrated), such that optional A/D converter 13 receives the signal received and suitably processed by antenna/analog conditioner 11 and optionally also downconverted by downconverter 12. The elements connecting antenna/analog conditioner 11, optional downconverter 12, and optional A/D converter 13 (or interference reduction circuit 100, if downconverter 12 and A/D converter 13 both are omitted) can include suitable conductive elements such as coaxial cables, transmission lines, or any other suitable conductor configured to transmit signals within a pre-defined spectral band from antenna/analog conditioner 11 to optional downconverter 12 or optional A/D converter 13 (or to interference reduction circuit 100, if downconverter 12 and A/D converter 13 both are omitted). Note, however, that the element(s) can include any path suitably configured to transmit the signal from antenna/analog conditioner 11 to downconverter 12, A/D converter 13, or interference reduction circuit 100 need not necessarily include a continuous conductor, e.g., the element(s) respectively can include a capacitor or transformer.

Optional A/D converter 13 is configured to digitize and quantize the signal that it receives from antenna/analog conditioner 11 or from optional downconverter 12, and provide as output digitized samples of the signal. As known to those of skill in the art of digital signal processing, A/D converters are commercially available devices that generate a digital version of an analog signal by sampling that signal at a specified rate. Note that in some embodiments, antenna/analog conditioner 11 can include its own A/D converter configured to digitize the received signal, or even can receive the signal in a digital format. In embodiments including A/D converter 13, the A/D converter can provide the digitized samples as output to interference reduction circuit 100 via an output port and a suitable path (not specifically illustrated). In one exemplary embodiment, receiver 10 includes an analog quadrature downconverter 12, and A/D converter 13 includes two parallel A/D converters that are configured so as to provide digitized samples as output to interference reduction circuit 100. In other embodiments, A/D converter 13 is omitted, and interference reduction circuit operates on the received signal in the analog domain.

In the embodiment illustrated in FIG. 1, interference reduction circuit 100 includes splitter subcircuit 110 that can be configured to split the received signal into a first portion and a second portion. The signal received by splitter subcircuit 110 can, for example, be an RF, IF, or baseband signal. Splitter subcircuit 110 can be implemented using any suitable analog or digital circuitry such as known in the art. Note that the first and second portions need not necessarily have the same amplitudes as one another.

Interference reduction circuit 100 further includes envelope detector 120 coupled to splitter subcircuit 110 or other suitable circuit configured to estimate an amplitude A(t) of the first portion as a function of time. Exemplary circuits and techniques for estimating signal amplitudes are described in Whitlow, Chapter VIII Design and Operation of Automatic Gain Control Loops for Receivers in Modern Communications Systems, 12 pages, retrieved online on Dec. 1, 2015 from www.analog.com/media/en/training-seminars/seminar-materials/55377178350571ChapterVIII_DesignAnd-OperationOfAutomaticGainControlLoops_Revised.pdf, the entire contents of which are incorporated by reference herein. In one non-limiting example, envelope detector 120 can include a half-wave diode circuit or full-wave diode circuit (rectifier) configured so as to generate an output based on the amplitude of the first portion of the signal, received from splitter subcircuit 110. As is known in the art and as described in Whitlow, envelope detectors and other circuits configured to estimate signal amplitudes can be configured to generate an output that is proportional to the absolute magnitude of the instantaneous RF input voltage followed by a low pass filter. Whitlow describes implementations with response times between 7 ms and 15 ms. Other response times can be used. For example, the envelope detector can have a bandwidth that is greater than or equal to the bandwidth (BW) of the desired signal. Illustratively, for an exemplary GPS C/A code (bandwidth 1.023 MHz), then the envelope detector can have a time constant $\tau = \frac{1}{2}\pi BW = 156$ nanoseconds or less.

Still referring to the embodiment illustrated in FIG. 1, interference reduction circuit 100 further includes interference suppression subcircuit 130 coupled to envelope detector 120 and configured to suppress at least a portion of the interference signal in the estimated amplitude A(t) to generate an interference suppressed amplitude A'(t). For example, interference reduction subcircuit 130 can include a filter, such as a high-pass filter or notch filter, that suitably can be configured to operate in the analog domain or in the digital domain based upon whether receiver 10 includes optional A/D converter 13. Illustratively, the high-pass or notch filter can be configured to as to suppress substantially all signal components at DC (0 Hz), with a sufficient bandwidth so as to suppress a suitable amount of the interference. For example, for interference that is truly constant envelope, then the high-pass or notch filter bandwidth can be set to the smallest practical value. For interference that is approximately constant envelope, then the high-pass or notch filter bandwidth can be increased so as to encompass all or at least a portion of the bandwidth of the interference. For example, the high-pass or notch filter bandwidth can be larger than the bandwidth of the changes in interference amplitude.

In the embodiment illustrated in FIG. 1, interference reduction circuit 100 further includes matched delay subcircuit 150 coupled to splitter subcircuit 110 and configured to delay the second portion of the signal (output by splitter subcircuit 110) by an amount of time corresponding to the estimation and suppression. For example, operation of envelope detector 120 and interference suppression subcircuit 130 upon the first portion of the signal can induce a delay in the first portion relative to the second portion that is output by splitter subcircuit 110. Matched delay subcircuit 150 can be configured to induce a delay in the second portion that is substantially the same as the delay that is induced in the first portion by envelope detector 120 and interference suppression subcircuit 130. Exemplary designs for delay circuits are well known in the art. For example matched delay subcircuit 150 can include a suitable length of coaxial cable. Other implementations, either fixed or adjustable, are well known and widely available as commercial off-the-shelf components.

Interference reduction circuit 100 further can include multiplier subcircuit 140 coupled to matched delay subcircuit 150 and interference suppression subcircuit 130 and configured to multiply the interference suppressed amplitude A'(t) by the delayed second portion to obtain an output having reduced contribution from the interference signal. In one non-limiting example, multiplier subcircuit 140 can include a high-bandwidth, four-quadrant analog multiplier such as known in the art. Alternatively, multiplier subcircuit 140 can include an RF modulator or frequency mixer. Multiplier subcircuit 140 can be configured so as to provide the output to receiver circuitry 14, e.g., such that the receiver can further process the desired signal with reduced contribution from the interference signal.

Note that components of receiver 10 and interference reduction circuit 100 can be implemented using any suitable circuits or components known in the art. For example, hardware circuits for performing A/D conversion are readily commercially available. As another example, splitter subcircuit 110, envelope detector 120, interference suppression subcircuit 130, multiplier subcircuit 140, and matched delay subcircuit 150 can be implemented using any suitable combination of arithmetic circuits that are known in the art for arithmetically operating on analog or digital signals (e.g., IIR filter, FIR filter, envelope detector, subtractor, adder, multiplier, splitter, or the like). Any such analog or digital hardware components suitably can be coupled together with any suitable paths, such as conductive elements or non-conductive elements. In other embodiments, the functionalities of one or more of the components of receiver 10 and interference reduction circuit 100 can be provided by a suitably programmed field-programmable gate array (FPGA) or application-specific integrated circuit (ASIC). FPGAs and ASICs are commercially available, and methods of programming same to achieve desired logical programming are known in the art. In still other embodiments, the functionalities of one or more of the components of receiver 10 and interference reduction circuit 100 can be provided by a suitably programmed computer, e.g., a personal computer including a processor and a non-transitory computer-readable medium storing instructions to cause the processor to perform the steps of the present methods or to implement the functionality of the present circuits. Alternatively, the processor can include a digital processor, such as a central processing unit (CPU) or graphics processor unit (GPU), or an analog processor.

It should be appreciated that interference reduction circuit 100 such as illustrated in FIG. 1 suitably can be implemented in a variety of contexts and using a variety of configurations. For example, FIGS. 2A-2E schematically illustrate selected components of exemplary circuits for reducing in the amplitude domain an interference signal that spectrally overlaps a desired signal, according to some embodiments provided herein.

Figure 2A:
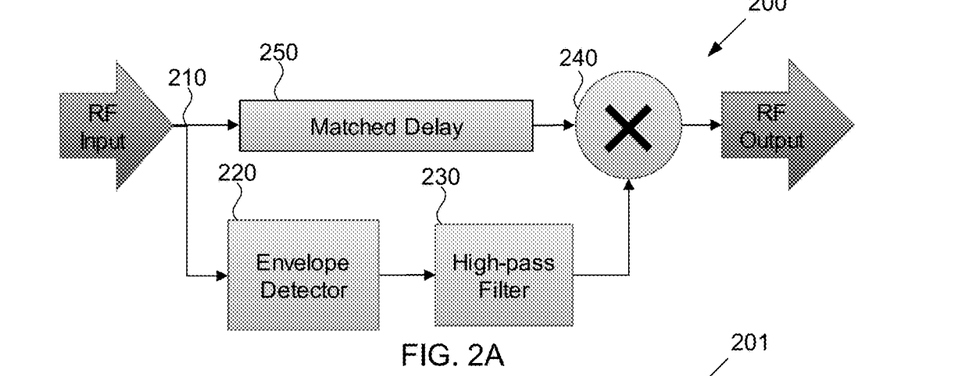
FIGS. 2A-2E schematically illustrate selected components of exemplary circuits for reducing in the amplitude domain an interference signal that spectrally overlaps a desired signal, according to some embodiments provided herein.

FIG. 2A illustrates an exemplary circuit 200 that includes splitter subcircuit 210 configured to split a received RF signal into a first portion that is output to envelope detector 220 and a second portion that is output to matched delay subcircuit 250. Envelope detector 220 is configured to estimate an amplitude A(t) of the first portion as a function of time. Circuit 200 further includes high-pass filter 230 or other suitable filter, e.g., notch filter, that suppresses at least a portion of the interference signal in the estimated amplitude A(t) and outputs interference suppressed amplitude A'(t). Matched delay subcircuit 250 induces in the second portion a delay that is approximately equal to the delay induced in the first portion by envelope detector 220 and high-pass filter 230. Multiplier subcircuit 240 multiplies the delayed second portion received from matched delay subcircuit 250 by the interference suppressed amplitude A'(t), and provides as output an RF signal having reduced contribution from the interference signal.

Figure 2B:
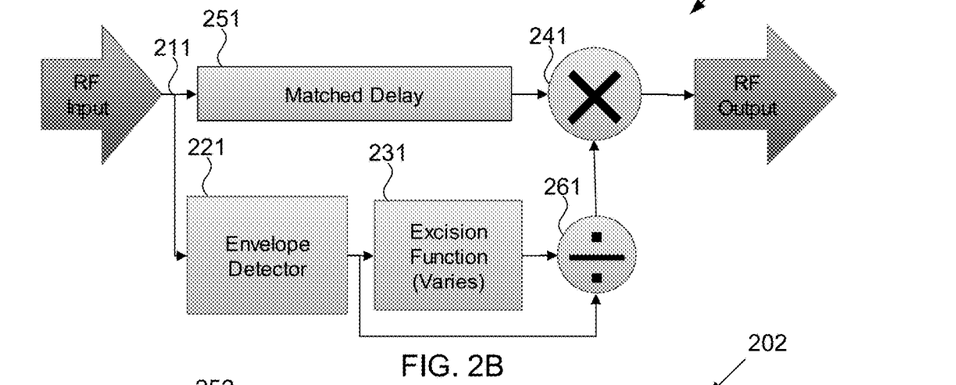

FIG. 2B illustrates an exemplary circuit 201 that includes splitter subcircuit 211 configured to split a received RF signal into a first portion that is output to envelope detector 221 and a second portion that is output to matched delay subcircuit 251. Envelope detector 221 is configured to estimate an amplitude A(t) of the first portion as a function of time. Circuit 201 further includes subcircuitry 231 for implementing an excision function that suppresses at least a portion of the interference signal in the estimated amplitude A(t) and outputs interference suppressed amplitude A'(t). The excision function implemented by subcircuitry 231 can vary. For example, in some embodiments, subcircuitry 231 includes a suitable filter, e.g., high-pass or notch filter, that suppresses at least a portion of the interference signal in the estimated amplitude A(t) and outputs interference suppressed amplitude A'(t). Circuit 201 can include adjustment subcircuitry (not expressly illustrated) configured so as to adjust a bandwidth of the filter, e.g., high-pass or notch filter, based on a characteristic of the output of the RF output. For example, circuit 201 can include a sensor configured to monitor at least one characteristic of the RF output that relates to the amount of residual interference in the RF output, and adjustment subcircuitry configured to adaptively adjust a bandwidth of the filter so as to reduce or minimize the amount of residual interference. As one example, the sensor can include a power meter, and the adjustment subcircuitry can be configured to adaptively adjust a bandwidth of the filter so as to reduce residual interference based on the power measured by the power meter. As another example, the sensor can be configured to measure the bandwidth or the peak to power ratio of A(t) being output by envelope detector 221, and the adjustment subcircuitry can be configured to adaptively adjust a bandwidth of the filter so as to increase the interference suppressed by subcircuitry 231 or to decrease the peak to power ratio of A(t). Additionally, or alternatively, the bandwidth adjustment can be driven by signal to noise ratio (SNR), or by various tracking-loop measurements. Note that the bandwidths of any of the filters such as described herein with reference to FIGS. 1, 2A-2E, and 3A-3B suitably can be adjusted, e.g., based on a characteristic of the output.

Additionally, note that subcircuitry 231 can be configured so as to implement any other suitable excision function, e.g., such as described in the following references, the entire contents of each of which are incorporated by reference herein: U.S. patent application Ser. No. 14/918,315 to Dafesh et al., filed Oct. 20, 2015 and entitled "Circuits and Methods for Reducing an Interference Signal that Spectrally Overlaps a Desired Signal;" U.S. patent application Ser. No. 14/887,848 to Dafesh et al., filed Oct. 20, 2015 and entitled "Systems and Methods for Reducing a Relatively High Power, Approximately Constant Envelope Interference Signal that Spectrally Overlaps a Relatively Low Power Desired Signal;" U.S. Pat. No. 9,197,360 to Wyckoff; Henttu, "A new interference suppression algorithm against broadband constant envelope interference," IEEE Milcom 2: 742-746 (2000); or Przyjemski et al., "GPS anti-jam enhancement techniques," Proceedings of the 49th Annual Meeting of the Institute of Navigation (1993), Jun. 21-23, 1993, Royal Sonesta Hotel, Cambridge, Mass.

Circuit 201 illustrated in FIG. 2B further includes scaling subcircuitry 261 configured to scale the RF output based on a dynamic range of circuitry receiving the output, e.g., based on a dynamic range of receiver circuitry 14 such as illustrated in FIG. 1. For example, the circuitry receiving the output may have a wide dynamic range, and the output prior to scaling may occupy only a small portion of that dynamic range. As another example, the output prior to scaling may exceed the dynamic range of the circuitry receiving the output. So as to more effectively use the full dynamic range of the circuitry receiving the output while remaining within the dynamic range of that circuitry, scaling circuitry 261 can be configured so as to divide A'(t) by a suitable value, thus scaling the RF output. For example, in some embodiments such as illustrated in FIG. 2B, scaling subcircuitry 261 can be coupled so as to receive A(t) from envelope detector 221 and configured so as to divide A'(t) by A(t), thus dividing the RF output by A(t). In other embodiments, scaling subcircuitry 261 can be configured so as to divide A'(t) or the RF output by a constant. In still other embodiments such as described herein with reference to FIGS. 2C-2E and 3A-3B, scaling subcircuitry 261 can be located at any suitable location(s) within the implementation and configured so as to apply automatic gain control (AGC) so as to scale the RF output, e.g., can be located before or after the splitter or before or after the multiplier. Note that any of the RF, IF, or baseband outputs such as described herein with reference to FIGS. 1, 2A-2E, and 3A-3B suitably can be scaled using scaling circuitry, e.g., based on a dynamic range of circuitry receiving the output.

Referring still to FIG. 2B, matched delay subcircuit 251 induces in the second portion a delay that is approximately equal to the delay induced in the first portion by envelope detector 221, subcircuitry 231 implementing the excision function, and scaling subcircuitry 261. Multiplier subcircuit 241 multiplies the delayed second portion received from matched delay subcircuit 251 by the interference suppressed amplitude A'(t), and provides as output an RF signal having reduced contribution from the interference signal and scaled based on the dynamic range of the circuitry receiving the RF signal.

Figure 2C:
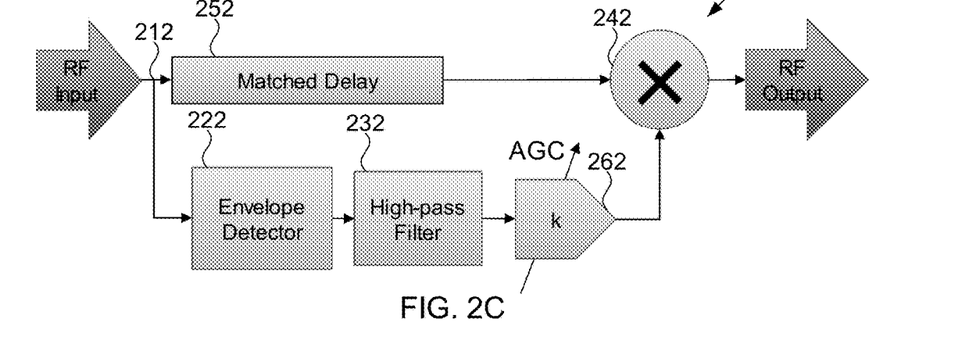

FIG. 2C illustrates an exemplary circuit 202 that includes splitter subcircuit 212 configured to split a received RF signal into a first portion that is output to envelope detector 222 and a second portion that is output to matched delay subcircuit 252. Envelope detector 222 is configured to estimate an amplitude A(t) of the first portion as a function of time. Circuit 202 further includes high pass filter 232 or other suitable filter, e.g., notch filter, that suppresses at least a portion of the interference signal in the estimated amplitude A(t) and outputs interference suppressed amplitude A'(t). Circuit 202 illustrated in FIG. 2C further includes automatic gain control (AGC) 262 configured to scale the RF output based on a dynamic range of circuitry receiving the output, e.g., based on a dynamic range of receiver circuitry 14 such as illustrated in FIG. 1. So as to more effectively use the full dynamic range of the circuitry receiving the output while remaining within the dynamic range of that circuitry, AGC 262 can be configured so as to multiply A'(t) by a suitable value, e.g., a constant k, thus scaling the RF output. For example, AGC 262 can be configured to as to maintain substantially constant power in the RF output. In many applications, including GPS, noise and signal power can be effectively constant, so in some embodiments, AGC 262 can be calibrated so as to produce an output that is substantially at the same level as the expected interference-free input of the receiver. Note that AGC 262 can be located at any suitable location(s) within the implementation and configured so as suitably to scale the RF output, e.g., can be located before or after the splitter or before or after the multiplier, and can be part of the present interference reduction circuit or can be part of an existing receiver. Note that any of the RF, IF, or baseband outputs such as described herein with reference to FIGS. 1, 2A-2E, and 3A-3B suitably can be scaled using an AGC, e.g., based on a dynamic range of circuitry receiving the output. AGC 262 also can be combined with a standard AGC function that sets the input level to a receiver's analog to digital converter to a fixed level prior to quantization. As is known in the art, AGCs are commercially available components that can include a variable-gain amplifier in a gradual feedback look with a power detector. The average output power of an AGC is substantially constant.

Referring still to FIG. 2C, matched delay subcircuit 252 induces in the second portion a delay that is approximately equal to the delay induced in the first portion by envelope detector 222, high-pass filter 232 or other filter, as well as AGC 262 in embodiments in which AGC 262 is located between splitter subcircuit 212 and multiplier subcircuit 242 and thus induces a delay in the first portion relative to the second portion. Multiplier subcircuit 242 multiplies the delayed second portion received from matched delay subcircuit 252 by the scaled interference suppressed amplitude A'(t), and provides as output an RF signal having reduced contribution from the interference signal and scaled based on the dynamic range of the circuitry receiving the RF signal.

Figure 2D:
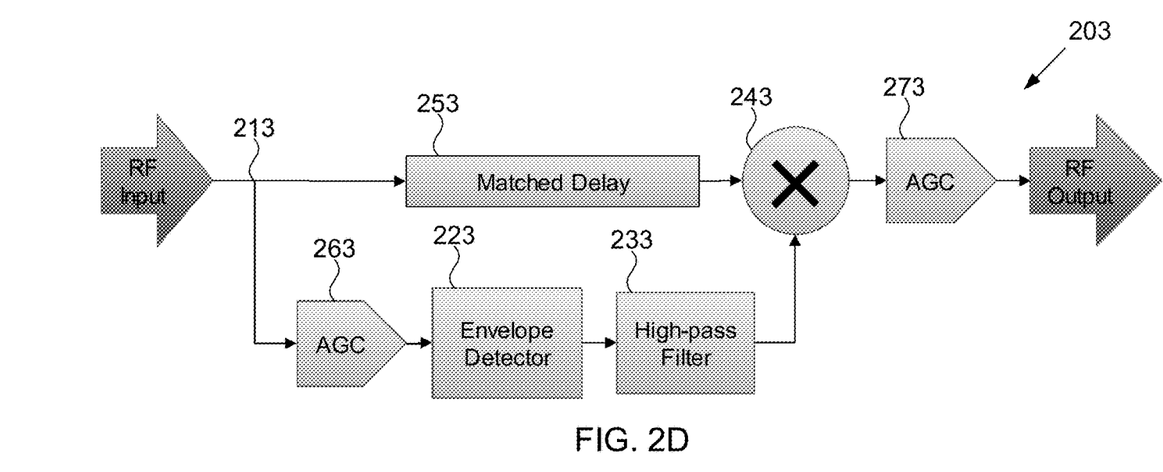

FIG. 2D illustrates an exemplary circuit 203 that includes splitter subcircuit 213 configured to split a received RF signal into a first portion that is output to first AGC 263 and a second portion that is output to matched delay subcircuit 253. First AGC 263 is configured so as to scale the first portion so as to maintain a consistent power at the input of envelope detector 223 so as to reduce or minimize the dynamic range requirements of envelope detector 223. Envelope detector 223 is configured to estimate an amplitude A(t) of the scaled first portion as a function of time. Circuit 203 further includes high pass filter 233 or other suitable filter, e.g., notch filter, that suppresses at least a portion of the interference signal in the estimated amplitude A(t) and outputs interference suppressed amplitude A'(t). Referring still to FIG. 2C, matched delay subcircuit 253 induces in the second portion a delay that is approximately equal to the delay induced in the first portion by envelope detector 223, high-pass filter 233 or other filter, and first AGC 263. Multiplier subcircuit 243 multiplies the delayed second portion received from matched delay subcircuit 253 by the scaled interference suppressed amplitude A'(t), and provides as output an RF signal having reduced contribution from the interference signal.

Circuit 203 illustrated in FIG. 2D further includes second AGC 273 configured to scale the RF output generated by multiplier subcircuit 243 based on a dynamic range of circuitry receiving the output, e.g., based on a dynamic range of receiver circuitry 14 such as illustrated in FIG. 1. So as to more effectively use the full dynamic range of the circuitry receiving the output while remaining within the dynamic range of that circuitry, second AGC 273 can be configured so as to multiply A'(t) by a suitable value, e.g., a constant k, thus scaling the RF output. For example, second AGC 273 can be configured to as to maintain substantially constant power in the RF output. In many applications, including GPS, noise and signal power can be effectively constant, so in some embodiments, the second AGC 273 can be calibrated so as to produce an output that is substantially at the same level as the expected interference-free input of the receiver. Note that second AGC 273 can be located at any suitable location(s) within the implementation and configured so as suitably to scale the RF output, e.g., can be located before or after the splitter or before or after the multiplier, and can be part of the present interference reduction circuit or can be part of an existing receiver. Note that any of the RF, IF, or baseband outputs such as described herein with reference to FIGS. 1, 2A-2E, and 3A-3B suitably can be scaled using one or more AGCs, e.g., based on a dynamic range of circuitry receiving the output or so as to maintain consistent power at the input to the envelope detector.

Figure 2E:
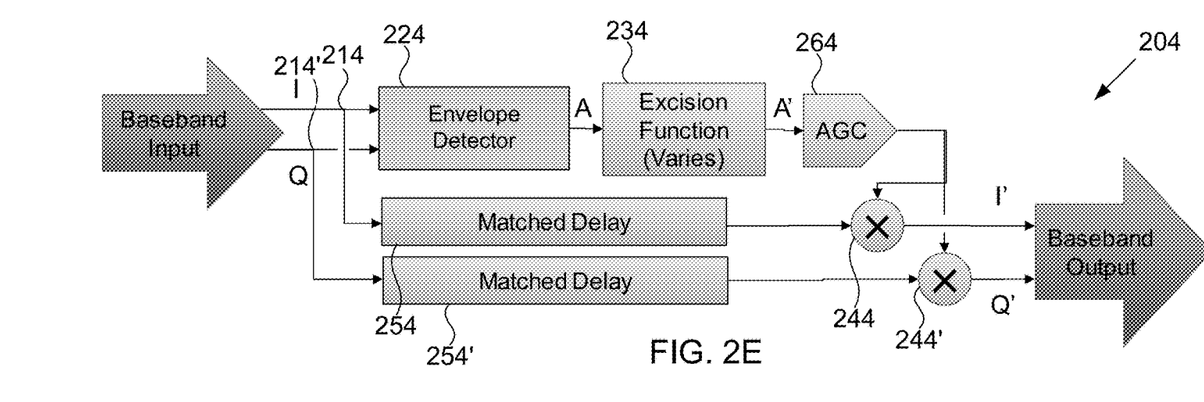

As noted elsewhere herein, the present circuits and methods suitably can be used to suppress interference in IF or complex baseband signals, and are not limited to processing RF signals. For example, FIG. 2E illustrates an exemplary circuit 204 that includes a first splitter subcircuit 214 configured to split the in-phase component of a received baseband signal into a first portion that is output to envelope detector 224 and a second portion that is output to a first matched delay subcircuit 254. Circuit 204 further includes a second splitter subcircuit 214' configured to split the quadrature component of a received baseband signal into a first portion that is output to envelope detector 224 and a second portion that is output to a second matched delay subcircuit 254'. Envelope detector 224 is configured to estimate an amplitude A(t) of the first portions of the in-phase and quadrature components as a function of time. For example, for a baseband signal, envelope detector 224 can include any suitable circuitry that calculates or approximates $A=\sqrt{I^2+Q^2}$, e.g., calculates A(t) arithmetically or using the CORDIC algorithm. A variety of approximate methods also exist, such as the alpha max plus beta min or Magnitude Estimator algorithms known in the art.

Circuit 204 further includes subcircuitry 234 for implementing an excision function that suppresses at least a portion of the interference signal in the estimated amplitude A(t) and outputs interference suppressed amplitude A'(t). The excision function implemented by subcircuitry 234 can vary. For example, in some embodiments, subcircuitry 234 includes a suitable filter, e.g., high-pass or notch filter, that suppresses at least a portion of the interference signal in the estimated amplitude A(t) and outputs interference suppressed amplitude A'(t). Circuit 204 can include adjustment subcircuitry (not expressly illustrated) configured so as to adjust a bandwidth of the filter, e.g., high-pass or notch filter, based on a characteristic of the output of the baseband output. For example, circuit 204 can include a sensor configured to monitor at least one characteristic of the baseband output that relates to the amount of residual interference in the baseband output, and adjustment subcircuitry configured to adaptively adjust a bandwidth of the filter so as to reduce or minimize the amount of residual interference. Additionally, or alternatively, the bandwidth adjustment can be driven by signal to noise ratio (SNR), or by various tracking-loop measurements. Note that the bandwidths of any of the filters such as described herein with reference to FIGS. 1, 2A-2E, and 3A-3B suitably can be adjusted, e.g., based on a characteristic of the output.

Additionally, note that subcircuitry 234 can be configured so as to implement any other suitable excision function, e.g., such as described in the following references, the entire contents of each of which are incorporated by reference herein: U.S. patent application Ser. No. 14/918,315 to Dafesh et al., filed Oct. 20, 2015 and entitled "Circuits and Methods for Reducing an Interference Signal that Spectrally Overlaps a Desired Signal;" U.S. patent application Ser. No. 14/887,848 to Dafesh et al., filed Oct. 20, 2015 and entitled "Systems and Methods for Reducing a Relatively High Power, Approximately Constant Envelope Interference Signal that Spectrally Overlaps a Relatively Low Power Desired Signal;" U.S. Pat. No. 9,197,360 to Wyckoff; Henttu, "A new interference suppression algorithm against broadband constant envelope interference," IEEE Milcom 2: 742-746 (2000); or Przyjemski et al., "GPS anti-jam enhancement techniques," Proceedings of the 49th Annual Meeting of the Institute of Navigation (1993), Jun. 21-23, 1993, Royal Sonesta Hotel, Cambridge, Mass.

Circuit 204 illustrated in FIG. 2E further includes automatic gain control (AGC) 264 configured to scale the baseband output based on a dynamic range of circuitry receiving the output, e.g., based on a dynamic range of receiver circuitry 14 such as illustrated in FIG. 1. So as to more effectively use the full dynamic range of the circuitry receiving the output while remaining within the dynamic range of that circuitry, AGC 264 can be configured so as to multiply A'(t) by a suitable value, e.g., a constant k, thus scaling the baseband output. For example, AGC 264 can be configured to as to maintain substantially constant power in the baseband output. In many applications, including GPS, noise and signal power can be effectively constant, so in some embodiments, AGC 264 can be calibrated so as to produce an output that is substantially at the same level as the expected interference-free input of the receiver. Note that AGC 264 can be located at any suitable location(s) within the implementation and configured so as suitably to scale the baseband output, e.g., can be located before or after the splitter or before or after the multiplier, and can be part of the present interference reduction circuit or can be part of an existing receiver. Note that any of the RF, IF, or baseband outputs such as described herein with reference to FIGS. 1, 2A-2E, and 3A-3B suitably can be scaled using an AGC, e.g., based on a dynamic range of circuitry receiving the output.

Referring still to FIG. 2E, first matched delay subcircuit 254 induces in the second portion of the in-phase component of the baseband signal component a delay that is approximately equal to the delay induced in the first portion of the in-phase component of the baseband signal component by envelope detector 224, subcircuitry 234 implementing the excision function, and AGC 264. Second matched delay subcircuit 254' induces in the second portion of the quadrature component of the baseband signal component a delay that is approximately equal to the delay induced in the first portion of the quadrature component of the baseband signal component by envelope detector 224, subcircuitry 234 implementing the excision function, and AGC 264. First multiplier subcircuit 244 multiplies the delayed second portion of the in-phase component of the baseband signal received from first matched delay subcircuit 254 by the interference suppressed amplitude A'(t), and provides as output an in-phase component of the baseband signal having reduced contribution from the interference signal and scaled based on the dynamic range of the circuitry receiving the baseband signal. Second multiplier subcircuit 244' multiplies the delayed second portion of the quadrature component of the baseband signal received from second matched delay subcircuit 254' by the interference suppressed amplitude A'(t), and provides as output a quadrature component of the baseband signal having reduced contribution from the interference signal and scaled based on the dynamic range of the circuitry receiving the baseband signal. In some embodiments, circuit 204 further can include one or more A/D converters for use in converting the baseband signal to digital before or after interference suppression.

Although not specifically illustrated, it should be understood that circuit 204 optionally further can include suitable subcircuitry configured to downconvert a received RF signal to the baseband signal received by splitters 214, 214'. For example, circuit 204 further can include a local oscillator for use in downconverting the RF signal to baseband and upconverting a processed baseband signal to RF, a quadrature downconverter coupled to the local oscillator and configured to receive and downconvert the RF signal and to provide the components of the resulting complex baseband signal to splitters 214, 214', and a quadrature upconverter coupled to the local oscillator and to multipliers 244, 244' and configured to upconvert the interference suppressed baseband signal to an RF output.

Figure 3A:
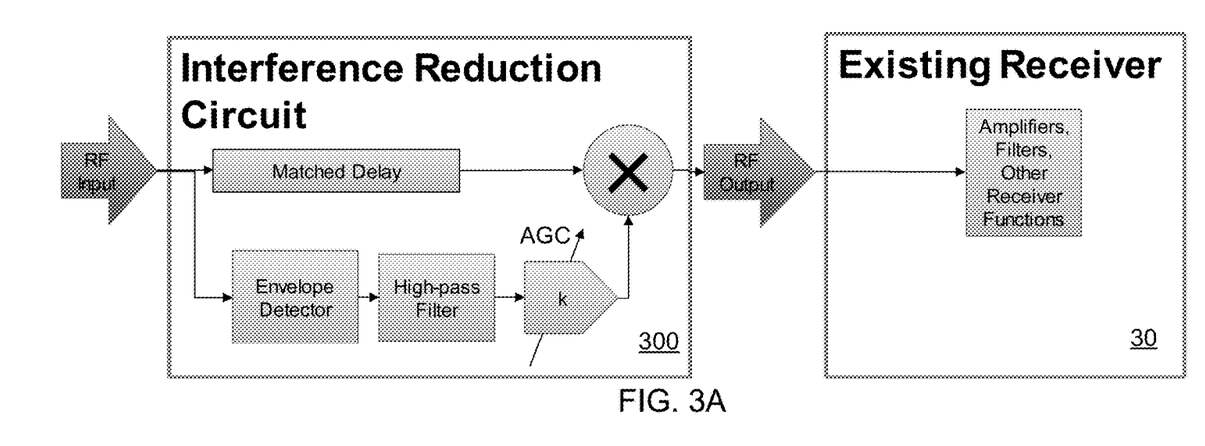
FIGS. 3A-3B schematically illustrate selected components of exemplary appliqué implementations for reducing in the amplitude domain an interference signal that spectrally overlaps a desired signal in a receiver, according to some embodiments provided herein.

As also noted further above, the present circuits and methods suitably can be implemented using existing receivers. For example, FIGS. 3A-3B schematically illustrate selected components of exemplary appliqué implementations for reducing in the amplitude domain an interference signal that spectrally overlaps a desired signal in a receiver, according to some embodiments provided herein. In the embodiment illustrated in FIG. 3A, interference suppression circuit 300 receives an RF input signal that includes a desired signal and an interference signal that spectrally overlaps the desired signal. Interference suppression circuit 300 can have any suitable configuration such as described herein with reference to FIGS. 1 and 2A-2E. In one non-limiting example such as illustrated in FIG. 3A, interference suppression circuit 300 is configured similarly as interference suppression circuit 202 described herein with reference to FIG. 2C. For example, interference suppression circuit 300 can include an envelope detector, a high pass filter, a matched delay subcircuit, a multiplier subcircuit, and an AGC located between the high-pass filter and the multiplier subcircuit and configured to scale the RF output based on a dynamic range of circuitry receiving the output. Interference suppression circuit 300 provides the scaled RF output to existing receiver 30 that includes amplifiers, filters, and circuitry for performing other receiver functions.

Figure 3B:
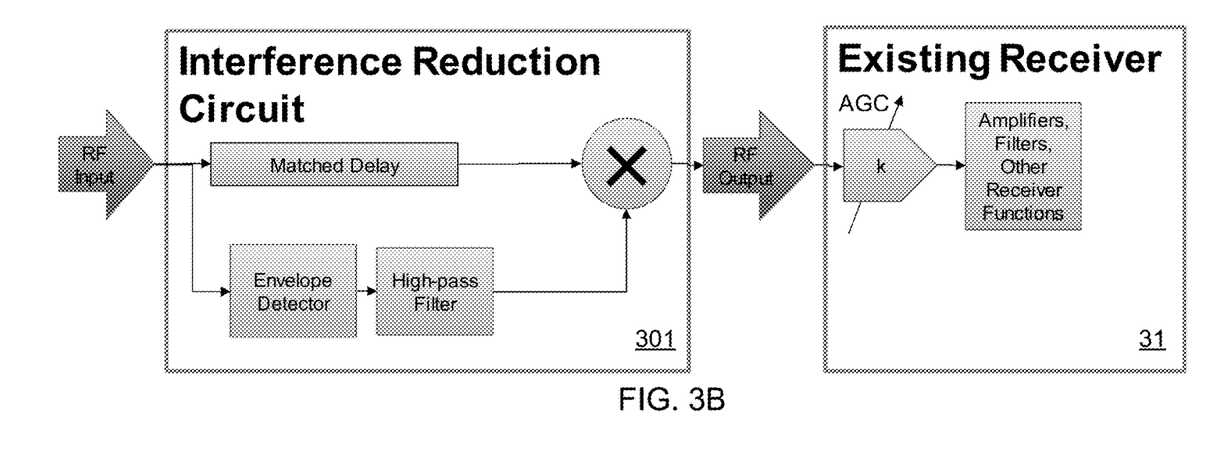

Alternatively, and as noted elsewhere herein, the present circuits and methods can be configured so as to work with an AGC that is part of the existing receiver, without requiring modification of the receiver or the AGC of the receiver. In the embodiment illustrated in FIG. 3B, interference suppression circuit 301 receives an RF input signal that includes a desired signal and an interference signal that spectrally overlaps the desired signal. Interference suppression circuit 301 can have any suitable configuration such as described herein with reference to FIGS. 1 and 2A-2E. In one non-limiting example such as illustrated in FIG. 3B, interference suppression circuit 301 is configured similarly as interference suppression circuit 200 described herein with reference to FIG. 2A. For example, interference suppression circuit 301 can include an envelope detector, a high pass filter, a matched delay subcircuit, and a multiplier subcircuit. Interference suppression circuit 301 can exclude an AGC, or optionally can include an AGC located before the envelope detector and configured to maintain a consistent power provided to the envelope detector. Interference suppression circuit 301 provides the RF output to existing receiver 31 that includes an AGC configured to scale the RF output received from interference suppression circuit 301, as well as amplifiers, filters, and circuitry for performing other receiver functions.

Figure 4:
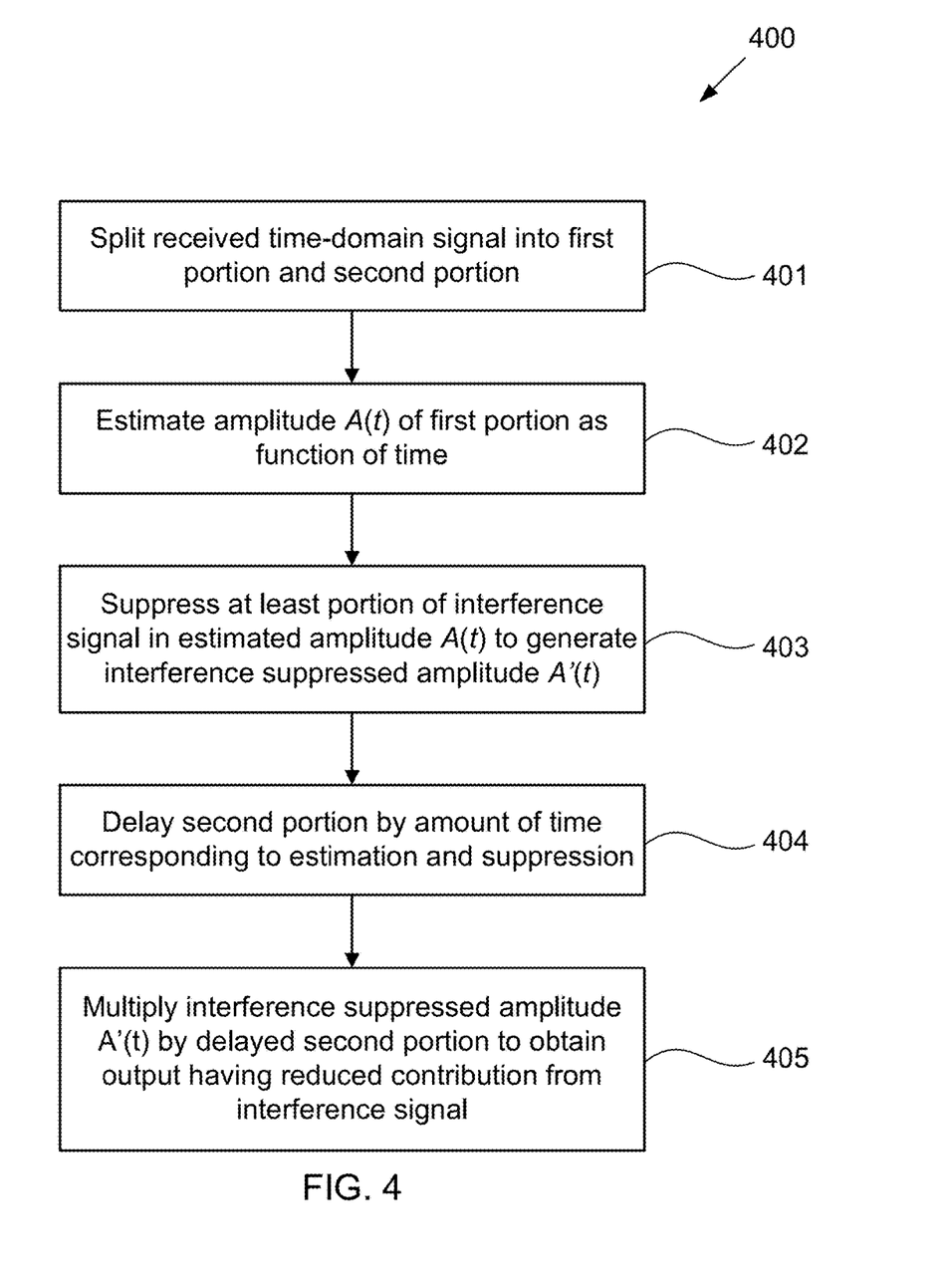
FIG. 4 illustrates steps in an exemplary method for reducing in the amplitude domain an interference signal that spectrally overlaps a desired signal, according to some embodiments provided herein.

It should be understood that any suitable variation of the present circuits can be used in a method for processing a signal that includes a desired signal and an interference signal that spectrally overlaps the desired signal. For example, FIG. 4 illustrates steps in an exemplary method for reducing in the amplitude domain an interference signal that spectrally overlaps a desired signal, according to some embodiments provided herein. The received signal can be, for example, an RF, IF, or baseband signal. Method 400 illustrated in FIG. 4 includes splitting the received signal into a first portion and a second portion (401). For example, such splitting can be performed by any of splitter subcircuit 110 described herein with reference to FIG. 1, splitter subcircuit 210 described herein with reference to FIG. 2A, splitter subcircuit 211 described herein with reference to FIG. 2B, splitter subcircuit 212 described herein with reference to FIG. 2C, splitter subcircuit 213 described herein with reference to FIG. 2D, or splitter subcircuits 214 and 214' described herein with reference to FIG. 2E.

Method 400 illustrated in FIG. 4 further includes estimating an amplitude A(t) of the first portion as a function of time (402). For example, such estimating can be performed by any of envelope detectors 120, 220, 221, 222, 223, or 224 respectively described herein with reference to FIGS. 1 and 2A-2E. Method 400 illustrated in FIG. 4 further includes suppressing at least a portion of the interference signal in the estimated amplitude A(t) to generate an interference suppressed amplitude A'(t) (403). For example, such suppressing can be performed by any of interference suppression subcircuit 130 described herein with reference to FIG. 1, high-pass filter 230 described herein with reference to FIG. 2A, subcircuitry 231 described herein with reference to FIG. 2B, high-pass filter 232 described herein with reference to FIG. 2C, high-pass filter 233 described herein with reference to FIG. 2D, or subcircuitry 234 described herein with reference to FIG. 2E. Illustratively, such suppressing can include applying a high-pass or notch filter to the amplitude A(t), and optionally further can include adjusting a bandwidth of the high-pass or notch filter based on a characteristic of the output.

Referring still to FIG. 4, method 400 further includes delaying the second portion by an amount of time corresponding to the estimation and suppression (404). For example, such delaying can be performed by any of matched delay subcircuits 150, 250, 251, 252, 253, or 254 and 254' respectively described herein with reference to FIGS. 1 and 2A-2E. Method 400 further can include multiplying the interference suppressed amplitude A'(t) by the delayed second portion to obtain an output having reduced contribution from the interference signal (405). Such multiplying can be, for example, performed by any of multiplier subcircuits 140, 240, 241, 242, 243, or 244 and 244' respectively described herein with reference to FIGS. 1 and 2A-2E.

Optionally, method 400 further can include including scaling the output based on a dynamic range of circuitry receiving the output. For example, such scaling can include dividing the output by A(t), e.g., in a manner such as described herein with reference to FIG. 2B. Or, for example, such scaling can include applying automatic gain control before or after the splitting or before or after the multiplying, e.g., in a manner such as described herein with reference to FIGS. 2C, 2D, 2E, 3A, and 3B.

Illustratively, in embodiments in which the received signal is a baseband signal, the second portion can include in-phase and quadrature components, and the delaying (404) can include delaying each of the in-phase and quadrature components. The multiplying (405) can include multiplying the interference suppressed amplitude A'(t) by the delayed in-phase component to obtain an in-phase component output having reduced contribution from the interference signal; and multiplying the interference suppressed amplitude A'(t) by the delayed quadrature component to obtain a quadrature component output having reduced contribution from the interference signal, e.g., in a manner such as described herein with reference to FIG. 2E.

EXAMPLES

The following examples are intended to be purely illustrative, and not limiting.

Figure 5A:
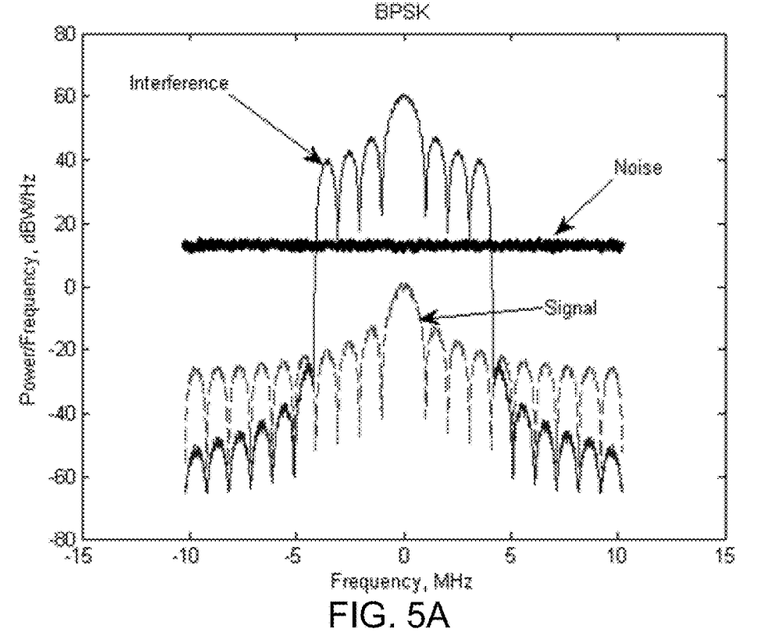
FIG. 5A illustrates an exemplary simulated received binary phase shift keying (BPSK) signal with noise and interference as a function of frequency.
Figure 5B:
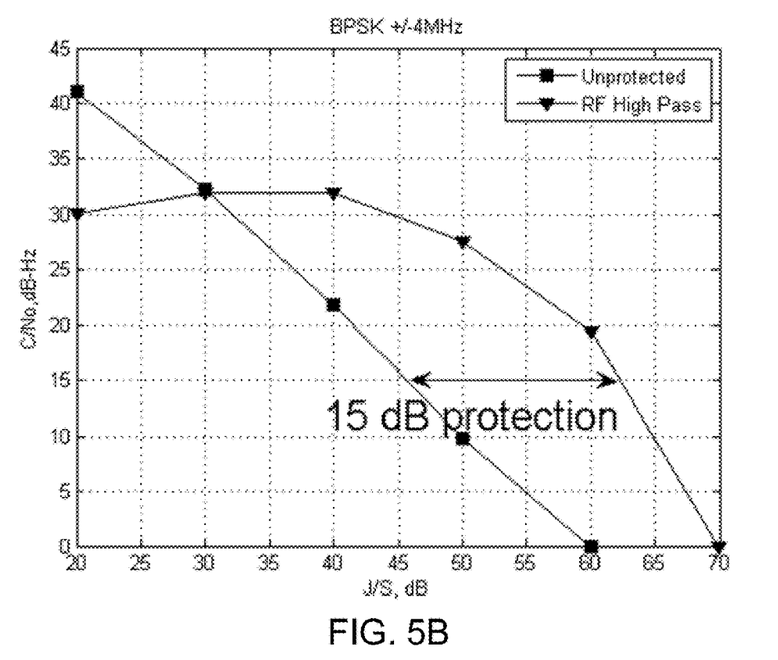
FIG. 5B illustrates a comparison of the C/N$_0$ for interference suppression based on reducing in the amplitude domain interference in the example signal illustrated in FIG. 5A, according to one non-limiting example provided herein.

A software simulation was constructed to illustrate that a purely RF implementation, without downconversion, could achieve satisfactory results. A first RF simulation upconverts a GPS plus interference signal to a real passband signal. For example, FIG. 5A illustrates an exemplary simulated received binary phase shift keying (BPSK) signal with noise and interference as a function of frequency. The simulation then recovers the envelope of the carrier using a full wave rectifier followed by a low pass filter. The envelope then is passed through a high pass (notch) filter having a cutoff frequency of 100 kHz. The output of the high pass (notch) filter then is multiplied by a delayed copy of the RF input signal. FIG. 5B illustrates a comparison of the $C/N_0$ for such interference suppression based on reducing in the amplitude domain interference in the example signal illustrated in FIG. 5A, according to one non-limiting example provided herein. FIG. 5B shows the J/S versus $C/N_0$ results for a filtered C/A code (BPSK 1 MHz) matched spectral interferer, filtered to ±4 MHz. Because it is bandlimited, the interferer does not have an ideal constant envelope. Nevertheless, the simulation demonstrates significant interference reduction. Commercial GPS receiver generally can maintain tracking when $C/N_0$ is 15 dB or higher. As observed, the unprotected receiver falls below this level when J/S is 47 dB (50,000). Above this level of interference, the unprotected receiver cannot function. The receiver protected using the present RF amplitude-domain implementation (using a high pass notch filter) maintains an adequate $C/N_0$ until the J/S reaches 62 dB (1,600,000). This is a 15 dB (30 times) improvement in the maximum tolerable interference power.

Figure 6A:
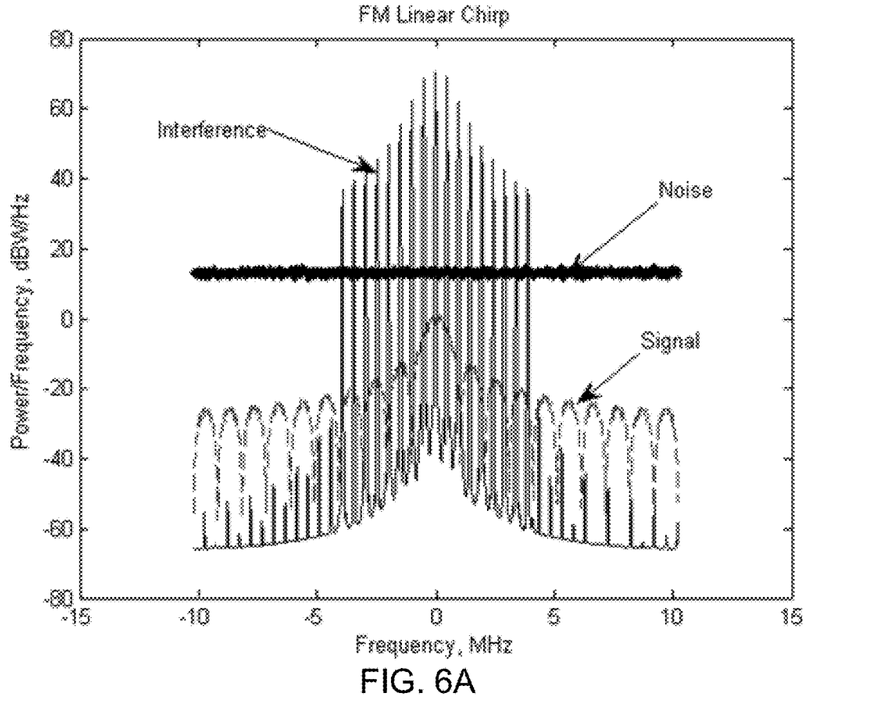
FIG. 6A illustrates an exemplary simulated received linear frequency modulation (FM) signal with noise and interference as a function of frequency.
Figure 6B:
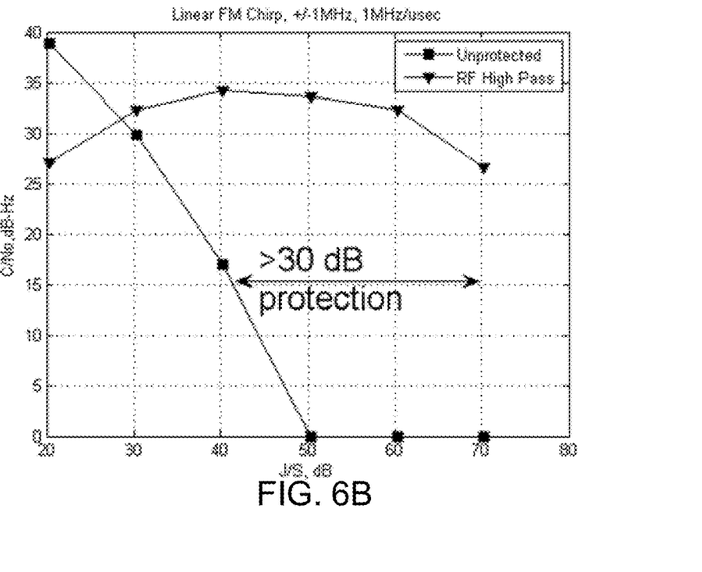
FIG. 6B illustrates a comparison of the C/N$_0$ for interference suppression based on reducing in the amplitude domain interference in the example signal illustrated in FIG. 6A, according to one non-limiting example provided herein.

In another example, FIG. 6A illustrates an exemplary simulated received linear frequency modulation (FM) signal with noise and interference as a function of frequency. Such a signal has more of a constant envelope than in the preceding example, and is typical of a "privacy jammer" in which the interference is linearly FM-chirp modulated in a manner such as described in Borio et al., "Fast and flexible: tracking and mitigating a jamming signal with an adaptive notch filter," Inside GNSS, March/April 2014, pages 67-73, the entire contents of which are incorporated by reference herein. In this example, the interferer is a CW tone that ramps its frequency from −1 MHz to +1 MHz in 2 μs. FIG. 6B illustrates a comparison of the $C/N_0$ for interference suppression based on reducing in the amplitude domain interference in the example signal illustrated in FIG. 6A using processing such as described above with reference to FIGS. 5A-5B, according to one non-limiting example provided herein. In this simulation, the interference is precisely constant envelope, so the performance of the interference suppression is stronger. For example, the unprotected receiver falls below the required $C/N_0$ threshold when J/S is 42 dB (16,000), while the protected receiver continues to operate even when J/S exceeds 72 dB (16,000,000) (the precise point of failure in this example exceeds the maximum simulated interference level). This represents an improvement of more than 30 dB (1000) in the maximum tolerable interference power.

While various illustrative embodiments of the invention are described above, it will be apparent to one skilled in the art that various changes and modifications can be made therein without departing from the invention. For example, interference reduction circuit 100 can be configured to work with, and be coupled to, a pre-existing receiver 10, but need not necessarily be considered to be an integral part of such a receiver or transponder, and indeed suitably can be used with any circuitry that would benefit from interference reduction. The appended claims are intended to cover all such changes and modifications that fall within the true spirit and scope of the invention.

What is claimed:

1. A method for reducing interference in a received signal comprising a desired signal and an interference signal that spectrally overlaps the desired signal, the method comprising:
   splitting the received signal into a first portion and a second portion;
   detecting an envelope of the first portion as a function of time so as to estimate an amplitude A(t) of the first portion as a function of time;
   suppressing the interference signal based on the estimated amplitude A(t) of the first portion to generate an interference suppressed amplitude A'(t) having reduced interference;
   delaying the second portion by an amount of time equal to a total time required to estimate the amplitude A(t) and to suppress the interference signal in the estimated amplitude; and
   multiplying the interference suppressed amplitude A'(t) by the delayed second portion to obtain an output having reduced interference,
   wherein the interference signal is not derived from the desired signal.

2. The method of claim 1, further comprising scaling the output based on a dynamic range of circuitry receiving the output.

3. The method of claim 1, wherein the received signal is a radio-frequency signal or an intermediate-frequency signal.

4. The method of claim 1, wherein the received signal is a baseband signal.

5. The method of claim 1, wherein said suppressing comprises applying a high-pass or notch filter to the amplitude A(t).

6. The method of claim 1, wherein the amplitude of the interference signal varies slowly relative to the bandwidth of the desired signal.

7. The method of claim 1, wherein the delaying is performed directly after the splitting.

8. The method of claim 1, further comprising demodulating the output having reduced interference.

9. The method of claim 2, wherein said scaling comprises dividing the output by A(t).

10. The method of claim 2, wherein said scaling comprises applying automatic gain control before or after the splitting or before or after the multiplying.

11. The method of claim 4, wherein:
the second portion comprises in-phase and quadrature components;
the delaying comprises delaying each of the in-phase and quadrature components; and
the multiplying comprises:
multiplying the interference suppressed amplitude A'(t) by the delayed in-phase component to obtain an in-phase component output having reduced interference; and
multiplying the interference suppressed amplitude A'(t) by the delayed quadrature component to obtain a quadrature component output having reduced interference.

12. The method of claim 5, further comprising adjusting a bandwidth of the high-pass or notch filter based on a characteristic of the output.

13. A circuit for reducing interference in a received signal comprising a desired signal and an interference signal that spectrally overlaps the desired signal, the circuit comprising:
a splitter subcircuit configured to split the received signal into a first portion and a second portion;
an envelope detector coupled to the splitter subcircuit and configured to detect an envelope of the first portion as a function of time so as to estimate an amplitude A(t) of the first portion as a function of time;
an interference suppression subcircuit coupled to the envelope detector and configured to suppress the interference signal based on the estimated amplitude A(t) of the first portion to generate an interference suppressed amplitude A'(t) having reduced interference;
a matched delay subcircuit coupled to the splitter subcircuit and configured to delay the second portion by an amount of time equal to a total time required to estimate the amplitude A(t) and to suppress the interference signal in the estimated amplitude; and
a multiplier subcircuit coupled to the matched delay subcircuit and the interference suppression subcircuit and configured to multiply the interference suppressed amplitude A'(t) by the delayed second portion to obtain an output having reduced interference,
wherein the interference signal is not derived from the desired signal.

14. The circuit of claim 13, wherein the received signal is a radio-frequency signal or an intermediate-frequency signal.

15. The circuit of claim 13, wherein the received signal is a baseband signal.

16. The circuit of claim 13, wherein said interference suppression subcircuit comprises a high-pass or notch filter configured to filter the amplitude A(t).

17. The circuit of claim 13, wherein the amplitude of the interference signal varies slowly relative to the bandwidth of the desired signal.

18. The circuit of claim 13, wherein the matched delay subcircuit is directly coupled to the splitter subcircuit.

19. The circuit of claim 13, further comprising a demodulator configured to receive and demodulate the output having reduced interference.

20. The circuit of claim 15, wherein:
the second portion comprises in-phase and quadrature components;
the matched delay subcircuit is configured so as to delay each of the in-phase and quadrature components; and
the multiplier subcircuit is configured so as to:
multiply the interference suppressed amplitude A'(t) by the delayed in-phase component to obtain an in-phase component output having reduced interference; and
multiply the interference suppressed amplitude A'(t) by the delayed quadrature component to obtain a quadrature component output having reduced interference.

21. The circuit of claim 16, further comprising adjustment subcircuitry configured so as to adjust a bandwidth of the high-pass or notch filter based on a characteristic of the output.

22. A circuit for reducing interference in a received signal comprising a desired signal and an interference signal that spectrally overlaps the desired signal, the circuit comprising:
a splitter subcircuit configured to split the received signal into a first portion and a second portion;
an envelope detector coupled to the splitter subcircuit and configured to detect an envelope of the first portion as a function of time so as to estimate an amplitude A(t) of the first portion as a function of time;
an interference suppression subcircuit coupled to the envelope detector and configured to suppress the interference signal based on the estimated amplitude A(t) of the first portion to generate an interference suppressed amplitude A'(t) having reduced interference;
a matched delay subcircuit coupled to the splitter subcircuit and configured to delay the second portion by an amount of time equal to a total time required to estimate the amplitude A(t) and to suppress the interference signal in the estimated amplitude;
a multiplier subcircuit coupled to the matched delay subcircuit and the interference suppression subcircuit and configured to multiply the interference suppressed amplitude A'(t) by the delayed second portion to obtain an output having reduced interference; and
scaling subcircuitry configured to scale the output based on a dynamic range of circuitry receiving the output,
wherein the interference signal is not derived from the desired signal.

23. The circuit of claim 22, wherein said scaling subcircuitry is configured to divide the output by A(t).

24. The circuit of claim 22, wherein said scaling subcircuitry is configured to apply automatic gain control before or after the splitting or before or after the multiplying.

* * * * *